United States Patent [19]

Cibura et al.

[11] Patent Number: 5,174,874
[45] Date of Patent: Dec. 29, 1992

[54] WATER-DISPERSIBLE BINDERS FOR CATIONIC ELECTROCOATING PAINTS, CONTAINING REACTION PRODUCTS BASED ON EPOXY RESINS AND PREPOLYMERS CONTAINING BOTH CARBOXYL AND HYDROXYL GROUPS

[75] Inventors: Klaus Cibura, Münster; Udo Reiter, Telgte; Walter Jouck, Münster, all of Fed. Rep. of Germany

[73] Assignee: BASF Corporation, Southfield, Mich.

[21] Appl. No.: 635,176

[22] Filed: Jan. 11, 1991

[30] Foreign Application Priority Data

Jul. 27, 1988 [DE] Fed. Rep. of Germany .... 3825464.6

[51] Int. Cl.⁵ .......................... C08L 63/02; C09D 5/44
[52] U.S. Cl. .................. 204/181.7; 523/414; 525/438
[58] Field of Search ............. 204/181.7; 523/414; 525/438

[56] References Cited

U.S. PATENT DOCUMENTS

| | | | |
|---|---|---|---|
| 3,502,620 | 3/1970 | Caldwell | 525/438 |
| 3,996,182 | 12/1976 | Hong et al. | 523/414 |
| 4,364,860 | 12/1982 | Patzschke et al. | 523/402 |
| 4,780,524 | 10/1988 | Dobbelstein et al. | 523/414 |

Primary Examiner—John C. Bleutge
Assistant Examiner—Frederick Krass
Attorney, Agent, or Firm—Frank G. Werner

[57] ABSTRACT

The invention relates to water-dispersible binders for cationic electrocoating paints, a process for the preparation of these binders and a process for electrophoretic coating of an electrically conducting substrate, connected as cathode, from an aqueous bath based on this binder.

The water-dispersible binders are reaction products of
(A) epoxy resins containing low-molecular, preferably aromatic groups, having an epoxide equivalent weight below 750,
(B) 10% to 60% by weight, prfererably 20% to 40% by weight, based on the total binder, of a prepolymer having a molecular weight (mass average) of 500 to 5000 and an average content per molecule of 0.1 to 1.9 hydroxyl groups and 0.1 to 1.0 carboxyl groups, the total of the hydroxyl and carboxyl groups being between 1 and 2, with an aromatic groups content of 10% to 45% by weight, calculated as phenylene groups contained in the resin solids in % by weight. In order to achieve water dispersibility, these reaction products are modified with
(C) primary, secondary and/or tertiary amines and/or their salts or a sulfide/acid mixture or a phosphine/acid mixture.

12 Claims, No Drawings

WATER-DISPERSIBLE BINDERS FOR CATIONIC ELECTROCOATING PAINTS, CONTAINING REACTION PRODUCTS BASED ON EPOXY RESINS AND PREPOLYMERS CONTAINING BOTH CARBOXYL AND HYDROXYL GROUPS

The present invention relates to water-dispersible binders for cationic electrocoating paints based on modified epoxy resins, the epoxy resins being reaction products of (A) epoxy resins containing low-molecular, preferably aromatic groups,
(B) a prepolymer having groups reactive toward epoxide groups,
(C) primary, secondary and/or tertiary amines and/or their salts or a sulfide/acid mixture or a phosphine/acid mixture.

The subject matter of the invention is furthermore a process for the preparation of these water-dispersible binders and a process for the coating of electrically conducting substrates.

Cationic electrocoating is a painting process frequently used especially for priming, in which synthetic resins carrying water-thinnable cationic groups are deposited on electrically conducting objects with the aid of direct current. The binders used for these electrocoating paints are modified epoxy resins.

In the synthesis as well as in the modification of epoxy resins, epoxide groups are opened with the formation of secondary hydroxyl groups. The OH groups formed in this way can again add onto an epoxide group, an ether linkage and a new secondary hydroxyl group being created.

Difficulties arise in the production on the industrial scale of modified epoxy resins, when it is not possible to control the reaction by suitable choice of reaction conditions in such a manner that a sufficient number of reactive epoxide groups become available for the desired modification reactions to be carried out.

Attempts have been made in the past to circumvent the production difficulties explained above by suppressing as much as possible the reaction between secondary hydroxyl groups and epoxide groups.

Thus, DE-PS 2,701,002 proposes for example to suppress the reaction between the secondary hydroxyl groups and the epoxide groups by lengthening the chains of the epoxy resins with the aid of organic polyols which carry at least two alcoholic primary OH groups, since the alcoholic primary OH groups are more reactive toward epoxide groups than are the secondary OH groups of the epoxy resin. Cationic electrocoating paints based on these modified epoxy resins, however, give rise to coatings which are in need of improvement particularly in respect of elasticity and interadhesion, i.e. on the one hand in respect of the adhesion to the substrate and on the other hand in respect of the adhesion of a variety of paints to the electrically deposited coating.

Another possibility for synthesizing modified epoxy resins is described in EP 4,090. In the process described therein, some of the reactive groups of the epoxy resin are first reacted with a modifying material selected from the groups of compounds containing carboxyl or amino or hydroxyl groups. In a second reaction step amino groups are then introduced into the epoxy resin by reaction with alkylketimines. However, these systems are likewise in need of improvement in respect of the elasticity of the resultant coatings.

Finally, a process is known from EP-A 59,895 for the preparation of modified epoxy resins in which the chains of low-molecular epoxy resins are first lengthened with the aid of aliphatic and/or alicyclic polyfunctional alcohols and/or carboxylic acids having a molecular weight below 350 and in a second step are modified by reaction with polyfunctional alcohols and/or carboxylic acids having a molecular weight of 500–5000. Amines and/or salts or similar groups are introduced subsequently to achieve water dispersibility. However, this process has the disadvantage of being very costly on account of the large number of process steps.

The object of the present invention has thus been to provide novel modified epoxy resins which may be used as binder components in cationic electrocoating paints and thus lead to coatings with improved elasticity or flexibility and improved interadhesion. Compared with the prior art, the coatings should in particular furnish improved results in the impact and reverse impact tests and improved Erichsen indentation.

Furthermore, it should be possible to prepare these modified epoxy resins by as simple a process as possible which would ensure that a sufficient number of reactive epoxide groups are available for carrying out the desired modification reaction.

The object was achieved according to the invention by preparing water-dispersible binders for cationic electrocoating paints based on modified epoxy resins, the epoxy resins being reaction products of (A) epoxy resins containing low-molecular, preferably aromatic groups,
(B) one or more prepolymers having groups reactive toward epoxide groups,
(C) primary, secondary and/or tertiary amines and/or their salts or a sulfide/acid mixture or a phosphine/acid mixture, wherein
a) epoxy resins having an epoxide equivalent weight below 750 are used as the component (A),
b) 10 to 60% by weight, preferably 20 to 40% by weight, based on the total binder, of one or more prepolymers having a molecular weight (mass average) of 500 to 5000 and an average content per molecule of 0.1 to 1.9 hydroxyl groups and 0.1 to 1.0 carboxyl groups are used as the component (B), the total of the hydroxyl and carboxyl groups being greater than, or equal to, 1 and smaller than, or equal to, 2,
c) the reaction product from (A) and (B) has an aromatic groups content of 10 to 45% by weight, calculated as phenylene groups contained in the resin solids in % by weight.

It is surprising and could not be foreseen that it is precisely the use of the abovementioned prepolymers containing OH and COOH groups as modifiers which leads to water-dispersible binders possessing the above desired properties.

Any compound which contains at least two reactive epoxide groups and has an epoxide equivalent weight below 750 may be used as the component A. Diglycidyl ethers of polyphenols prepared from polyphenols and epihalohydrins are particularly preferred epoxide compounds. The following, for example, may be employed as polyphenols:

Most particularly preferred: bisphenol A and bisphenol F

Particularly preferred: 1,1-bis(4-hydroxyphenyl)-n-heptane

In addition 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis- 1-(2-hydroxynaphthyl)methane, 1,5-dihydroxynaphthalene and phenolic novolak resins are also suitable.

Preferred epoxide compounds are also diglycidyl ethers of polyhydric alcohols such as ethylene glycol, diethylene glycol, triethylene glycol, 1,2-propylene glycol, 1,4-propylene glycol, 1,5-pentanediol, 1,2,6-hexanetriol, glycerol and bis(4-hydroxycyclohexyl)-2,2-propane.

Diglycidyl esters of polycarboxylic acids such as, for example, oxalic acid, succinic acid, glutaric acid, terephthalic acid, 2,6-naphthalene-dicarboxylic acid, dimerized linolenic acid etc. may be also used. Typical examples are glycidyl adipate and glycidyl phthalate.

In addition, hydantoin epoxides, epoxidized polybutadiene and diepoxide compounds which are obtained by epoxidation of an olefinically unsaturated alicyclic compound, are suitable.

Any prepolymer which carries on average 0.1 to 1.9 hydroxyl groups and 0.1 to 1.0, preferably 0.3 to 0.7, carboxyl groups per molecule, the total of the hydroxyl and carboxyl groups being greater than, or equal to, 1 and smaller than, or equal to, 2, may be used as the component B. The molecular weight (mass average) of the prepolymers is 500 to 5000, preferably 530 to 3000. Linear polyesters are preferably used as the component B.

The polyesters may be prepared by polyesterification of organic polycarboxylic acids or their anhydrides with organic polyols which contain primary hydroxyl groups. The polycarboxylic acids and the polyols are usually aliphatic or aromatic dicarboxylic acids and diols.

The diols used for the preparation of the polyesters comprise alkylene glycols such as ethylene glycol, butylene glycol, neopentyl glycol and other glycols such as cyclohexanedimethanol.

The acid component of the polyester consists primarily of low-molecular carboxylic acids or their anhydrides having 2 to 18 carbon atoms in the molecule. Examples of suitable acids are phthalic acid, isophthalic acid, terephthalic acid, tetrahydrophthalic acid, hexahydrophthalic acid, adipic acid, succinic acid, azelaic acid, sebacic acid, maleic acid and glutaric acid. Anhydrides of these acids, insofar that they exist, may be also used in their place.

Apart from standard polyesterification, it is further possible to prepare the linear polyesters carrying OH and COOH groups preferably by a 2-stage process, in which the components described above are in the first stage converted to a polyester diol by an excess of the corresponding diol, i.e. to a molecule having terminal OH groups at both ends of the polyester chain, and subsequently, in a second reaction using an anhydride, for example phthalic anhydride or succinic anhydride, the polyester diol is reacted to give the polyester carrying OH and COOH groups.

The component B is added in an amount from 10 to 60% by weight, preferably 20 to 40% by weight, in each case based on the total binder. The amount of component B should be chosen such that the molar ratio of the component A to the component B is between 4:1 and 1:1, preferably 2.5:1 to 1.5:1, and that the resultant intermediate possesses enough free epoxide groups for the modification reaction with the component C which is necessary to achieve water thinnability. Furthermore, depending on the epoxy resin employed, the amount of the component B must be chosen such that the intermediate obtained from A and B has an aromatic groups content of 10 to 45% by weight, calculated as phenylene groups contained in the resin solids in % by weight.

The reaction of the component A with the component B is carried out at temperatures from 100° to 190° C., in the presence of a catalyst if desired, either in the absence of a solvent or in an inert solvent such as, for example, aromatic hydrocarbons, preferably xylene or other methylbenzenes.

It is furthermore possible to lengthen the chains of epoxy resins of very low molecular weight in situ during the reaction with the component B by adding, for example, bisphenol A.

The intermediate prepared from the components A and B has a molecular weight (mass average) of 2000 to 6000.

By using a modifier containing carboxyl groups as the component B, the complete incorporation of the modifier via these COOH groups is assured owing to the higher reactivity of COOH groups toward OH groups. Polyesters having one (1.0) carboxyl group in the molecule are therefore preferably used.

To achieve water dispersibility, the intermediate prepared from the component A and the component B, containing epoxide groups, is furthermore modified by reaction with the component C. In addition to this preferred reaction sequence the possibility also exists of course of first the component A containing a less than stoichiometric amount of the component C to an intermediate containing epoxide groups followed by reaction with the component B. This reaction sequence is described, for example, in DE-PS 2,701,002.

Primary or secondary amines or their salts, salts of tertiary amines, sulfide/acid or phosphine/acid mixtures or a mixture of these compounds may be used as the component C, the secondary amines being particularly preferred components C.

The amine should preferably be a water-soluble compound. Examples of such amines are monoalkyl- and dialkylamines, such as methylamine, ethylamine, propylamine, butylamine, dimethylamine, diethylamine, dipropylamine, methylbutylamine and the like. Alkanolamines such as, for example, methylethanolamine, diethanolamine and the like are also suitable. Furthermore, dialkylaminoalkylamines such as, for example, dimethylaminoethylamine, diethylaminopropylamine, dimethylaminopropylamine and the like are suitable.

In the majority of cases low-molecular amines are employed, but it is also possible to use higher-molecular monoamines.

Polyamines with primary and secondary amino groups may be reacted with the epoxide groups in the form of their ketimines. The ketimines are prepared from the polyamines in a known manner.

The amines may also contain other groups, but these should not interfere with the reaction of the amine with the epoxide group and should not lead to gelling of the reaction mixture.

The charges which are necessary for water thinnability and electrical deposition may be produced by protonization with water-soluble acids (for example boric acid, formic acid, lactic acid, propionic acid, butyric acid, hydrochloric acid, phosphoric acid, sulfuric acid, carbonic acid and preferably acetic acid) or also by reaction of oxirane groups with the salts of an amine or a sulfide/ acid mixture or a phosphine/acid mixture.

The salt of a tertiary amine may be used as the salt of an amine.

The amine moiety of the amine-acid salt is an amine which may be unsubstituted or substituted as in the case of hydroxylamine, where these substituents should not interfere with the reaction of the amine-acid salt with the polyepoxide and the reaction mixture should not gel. Preferred amines are tertiary amines, such as dimethylethanolamine, triethylamine, trimethylamine, triisopropylamine and the like. Examples of other suitable amines are given in U.S. Pat. No. 3,839,252, column 5, line 3 to column 7, line 42.

The amine-acid salt mixture is obtained by reacting the amine with the acid in a known manner. Amineacid mixtures may be also used, although they usually react with the formation of the acid salt.

Reaction of the oxirane groups with a sulfide in the presence of an acid produces resins with sulfonium groups.

Any sulfide which reacts with epoxide groups and contains no groups that interfere with the reaction may be used as the sulfide. The sulfide may be an aliphatic, mixed aliphatic-aromatic, aralkyl or cyclic sulfide. Examples of such sulfides are dialkyl sulfides such as diethyl sulfide, dipropyl sulfide, dibutyl sulfide, dihexyl sulfide, or alkylphenyl sulfides such as diphenyl sulfide, ethylphenyl sulfide, alicyclic sulfides such as tetramethylene sulfide, pentamethylene sulfide, or hydroxyalkyl sulfides such as thiodiethanol, thiodipropanol, thiodibutanol and the like.

Any acid which forms a tertiary sulfonium salt may be used as the acid. However, an organic carboxylic acid is preferred as the acid. Examples of suitable acids are boric acid, formic acid, lactic acid, acetic acid, propionic acid, butyric acid, hydrochloric acid, phosphoric acid and sulfuric acid. The acid preferably has a dissociation constant greater than about $1 \times 10^{-5}$.

The ratio of sulfide to acid is not particularly critical. Since one equivalent of acid is used for the formation of one mol of a sulfonium group, at least one equivalent of acid is used for each desired mol in the conversion of sulfide to sulfonium.

Reaction of the oxirane groups with a phosphine in the presence of an acid gives rise to resins with phosphonium groups.

The phosphine used may be any phosphine which is free from any interfering groups. Examples of such phosphines are aliphatic, aromatic or alicyclic phosphines, the following phosphines being cited as specific examples:

low trialkylphosphines such as trimethylphosphine, triethylphosphine, tripropylphosphine, tributylphosphine, mixed low alkylphenylphosphines such as phenyldimethylphosphine, phenyldiethylphosphine, phenyldipropylphosphine, diphenylmethylphosphine, diphenylethylphosphine, diphenylpropylphosphine, triphenylphosphine, alicyclic phosphines such as tetramethyleneethylphosphine and the like.

The acid used may be any acid which forms a quaternary phosphonium salt. However, an organic carboxylic acid is preferred as the acid. Examples of suitable acids are boric acid, lactic acid, formic acid, acetic acid, propionic acid, butyric acid, hydrochloric acid, phosphoric acid and sulfuric acid.

The acid should preferably have a dissociation constant greater than about $10^{-5}$.

The ratio of phosphine to acid is not particularly critical. Since one equivalent of acid is required for the formation of one mol of a phosphonium group, about one equivalent at least of acid is used for each mol in the desired conversion of phosphine to phosphonium.

The binders prepared according to the invention may be converted into self-crosslinking systems by the addition of crosslinking agents or by chemical modification. A self-crosslinking system may be obtained, for example, by reacting the binder with a partly blocked polyisocyanate which, on average, has one free isocyanate group per molecule and whose blocked isocyanate groups may only be unblocked at elevated temperatures.

The crosslinking agents are usually employed in an amount from 5 to 60, preferably 20 to 40% by weight, based on the binder.

Methods for crosslinking of binders which are frequently used, are disclosed, for example, in the following patents: GB 1,303,480, European Patent Application 12,463, U.S. Pat. No. 4,252,703 and GB 1,557,516.

Examples of suitable aminoplast crosslinking agents are the hexamethyl ether of hexamethylolmelamine, the triethyl trimethyl ether of hexamethylolmelamine, the hexabutyl ether of hexamethylolmelamine and the hexamethyl ether of hexamethylolmelamine and polymeric butylated melamine formaldehyde resins. Alkylated urea-formaldehyde resins may be also used.

Blocked polyisocyanates are preferably used as crosslinking agents. Any polyisocyanate may be employed in the invention in which the isocyanate groups have been reacted in such a manner that the resultant blocked polyisocyanate is non-reactive toward hydroxyl groups at room temperature but reacts with them at elevated temperatures, usually in the range from about 90° to about 300° C. Any organic polyisocyanates which are suitable for the crosslinking may be used in the preparation of the blocked polyisocyanates. Isocyanates which contain about 3 to about 36, particularly about 8 to about 15 carbon atoms, are preferred. Examples of suitable diisocyanates are trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4'-diphenylene diisocyanate, 1,5-naphthalene diisocyanate, 1,4-naphthalene diisocyanate, 1-isocyanatomethyl-5-isocyanato-1,3,3-trimethylcyclohexane, bis(4-isocyanatocyclohexyl)methane, bis-(4-isocyanatophenyl)methane, 4,4'-diisocyanatodiphenyl ether and 2,3-bis(8-isocyanatooctyl)-4-octyl-5-hexylcyclohexane. However, it is also possible to employ polyisocyanates of higher isocyanate functionality. Suitable examples of these are tris(4-isocyanatophenyl)methane, 1,3,5-triisocyanatobenzene, 2,4,6-triisocyanatotoluene, 1,3,5-tris(6-isocyanatohexyl)biuret, bis(2,5-diisocyanato-4-methylphenyl)methane, and polymeric polyisocyanates such as dimers and trimers of diisocyanatotoluene. Furthermore mixtures of polyisocyanates may also be employed. The organic polyisocyanates used in the invention as crosslinking agents may also be prepolymers which are derived, for example, from a polyol including a polyether polyol or a polyester polyol.

Any suitable aliphatic, cycloaliphatic or aromatic alkylmonoalcohols may be used for blocking the polyisocyanates. Examples of these are aliphatic alcohols such as methyl, ethyl, chloroethyl, propyl, butyl, amyl, hexyl, heptyl, octyl, nonyl, 3,5,5-trimethylhexyl, decyl and lauryl alcohol; cycloaliphatic alcohols such as cyclopentanol or cyclohexanol; aromatic alkylalcohols such as phenylcarbinol and methylphenylcarbinol.

Other suitable blocking agents are hydroxylamines such as ethanolamine, oximes such as methyl ethyl ketone oxime, acetone oxime and cyclohexanone oxime, or amines such as dibutylamine and diisopropylamine. The polyisocyanates and blocking agents cited may be also used in suitable proportions for the preparation of the partly blocked polyisocyanates described above.

Pigments and generally customary additives such as, for example, coalescing solvents, surfactants, crosslinking catalysts, antioxidants, fillers and antifoams may be added in the usual amounts to the aqueous coating compositions prepared using the binders according to the invention.

The aqueous systems prepared with the aid of the binders according to the invention are particularly suitable for the cationic electrocoating process; however, they may also be employed in conventional coating processes. Metals, pretreated if desired, such as iron, steel, copper, zinc, brass, magnesium, tin, nickel, chromium and aluminum, as well as impregnated paper and other electrically conducting substrates may be used, for example, as the substrates to be coated.

The use of the binders according to the invention leads to coatings having high elasticity and flexibility as well as good interadhesion characteristics. When used in cationic electrocoating processes, the binders according to the invention furnish coatings which, compared with the prior art, have distinctly improved impact, reverse impact and Erichsen indentation values.

The binders according to the invention are also suitable for the preparation of pigment pastes, which means that the binders may be also used as grinding resins.

If the resin according to the invention is used as grinding resin for the preparation of a pigment paste, the proportions of the modified epoxy resin containing epoxide groups (reaction product from A and B) and of the organic tertiary amine which are reacted with each other, are preferably chosen such that the carrier resin contains 0.8 to 2.0 nitrogen atoms per molecule. Smaller amounts of quaternary nitrogen may lead to poor pigment wettability, whilst higher amounts cause the resins to be too water-soluble.

Pigment pastes according to the invention are prepared by comminuting or dispersing a pigment in the grinding resin in a well-known manner. The pigment paste contains the grinding resin and at least one pigment as essential components.

However, other customary additives, such as plasticizers, wetting agents, surfactants or antifoams, may be also present in the pigment composition.

The grinding of the pigments is usually carried out in ball mills, sand mills, Cowles mills and continuous grinding equipment until the pigment has been comminuted to the desired particle size and preferably has been wetted by, or dispersed in, the resin. After the comminution, the particle size of the pigment should be in the range of 10 microns or less. Comminution is in general carried out to a Hegman fineness of about 6 to 8.

The well-known pigments may be used as pigment in the invention. Titanium dioxide is generally the sole or the principal white pigment. However, other white pigments or extenders, such as antimony oxide, zinc oxide, basic lead carbonate, basic lead sulfate, barium carbonate, porcelain, clay, calcium carbonate, aluminum silicate, silicon dioxide, magnesium carbonate and magnesium silicate may be also used. Cadmium yellow, cadmium red, carbon black, phthalocyanine blue, chrome yellow, toluidine red and hydrated iron oxide may be used, for example, as colored pigments. For further general notes on pigment comminution and the formulation of coating compositions, reference should be made to the following books: D. H. Parker, Principles of Surface Coating Technology, Interscience Publishers, New York (1965) R. L. Yates, Electropainting, Robert Draper Ltd. Teddington England (1966) H. F. Payne, Organic Coating Technology, volume 2, Wiley and Sons, N.Y. (1961).

The invention also relates to a process for the preparation of binders for cationic electrocoating paints based on modified epoxy resins, which binders optionally contain crosslinking agents, pigments, flow-out agents and other customary auxiliary agents and in which the epoxy resins are reaction products of (A) epoxy resins containing low-molecular, preferably aromatic groups, (B) one or more prepolymers having groups reactive toward epoxide groups, (C) primary, secondary and/or tertiary amines and/or their salts or a sulfide/acid mixture or a phosphine/acid mixture wherein a) epoxy resins having an epoxide equivalent weight below 750 are used as the component (A), b) 10 to 60% by weight, preferably 20 to 40% by weight, based on the total binder, of one or more prepolymers having a molecular weight (mass average) of 500 to 5000 and an average content per molecule of 0.1 to 1.9 hydroxyl groups and 0.1 to 1.0 carboxyl groups are used as the component (B), the total of the hydroxyl and carboxyl groups being greater than, or equal to, 1 and smaller than, or equal to, 2, c) the reaction product from (A) and (B) has an aromatic groups content of 10 to 45% by weight, calculated as phenylene groups contained in the resin solids in % by weight.

To prepare the intermediate, the components (A) and (B) are used in a molar ratio of 4:1 to 1:1, preferably 2.5:1 to 1.5:1, the conditions outlined in the description of the binders having to be adhered to, however.

The process according to the invention is carried out in the following manner:

The components A and B are mixed and completely reacted, if desired in the presence of catalysts such as, for example, tertiary amines, in the absence of a solvent or in the presence of inert solvents such as aromatic hydrocarbons, preferably xylene or other methyl aromatic solvents, at temperatures between 100° and 190° C. (The completeness of the reaction may be verified by determining the epoxide equivalent weights).

The reaction product obtained in this manner may then be further modified with the component C.

The reaction between amines (component C) and intermediates containing epoxy groups frequently already sets in when the co-reactants are mixed. Depending on the desired course of reaction—especially for the reaction to go to completion—it is recommended to raise the temperature to 50° to 150° C.

Apart from this preferred reaction sequence, it is of course also possible first to react the component A and the component C in an entirely analogous manner to form an intermediate which is subsequently modified by the component B. This reaction sequence is described, for example, in DE-PS 2,701,002.

For the reaction with the compound containing epoxide groups (intermediate Z or component A, depending on the chosen reaction sequence), the amount of amine used should be at least such that the resin assumes a cationic character, i.e. that it migrates in the coating bath to the cathode under the influence of a voltage after being rendered water-thinnable by the addition of an acid. Essentially all the epoxide groups of the resin may be reacted with an amine. It is also possible, however, to leave free an excess of epoxide groups in the resin.

Another possibility of achieving the required water dispersibility consists in using Mannich bases, i.e. reaction products of suitable phenols carrying groups suitable for reaction with an epoxide ring, with formaldehyde and a secondary amine. The binder thereby at the same time becomes self-crosslinkable.

The reaction with amine-acid salts is carried out at temperatures from 20° to 110° C. The reaction may be carried out without the addition of solvents, but it can be more easily controlled in the presence of solvents such as aromatic hydrocarbons or monoalkyl ethers of ethylene glycol.

The ratio between the amine-acid salt and the epoxide compound may fluctuate and the optimum ratios depend on the specific starting materials. About 1 to about 50 parts by weight of salt to 100 parts by weight of polyepoxide may be generally used. The ratio chosen generally depends on the nitrogen content derived from the quaternizing agent, a typical value of which is about 0.05 to about 16%, based on the total weight of the amine salt and the polyepoxide.

The reaction between the sulfide/acid mixture and the epoxide compound is carried out by mixing the components and heating the mixture usually to moderately high temperatures, such as 70° to 110° C. A solvent is not necessary, although it is frequently used in order to make the reaction better controllable. Suitable solvents are aromatic hydrocarbons, monoalkyl ethers of ethylene glycol and aliphatic alcohols. The proportions of the sulfide and the epoxide compound may be varied and the optimum ratios of the two components depend on the specific starting materials. However, about 1 to 50 parts by weight of sulfide are usually employed to 100 parts by weight of the epoxide compound. The ratios are frequently referred to the sulfur content, a typical value of which is about 0.1 to 35%, based on the total weight of the sulfide and the epoxide compound.

The reaction between the phosphine/acid mixture and the epoxide compound is carried out by mixing the components, the mixture being sometimes heated to moderately high temperatures. The reaction temperature is not particularly critical and is chosen depending on the starting materials and their rates of reaction. The reaction frequently proceeds at a sufficiently fast rate at room temperature or at temperatures up to 70° C. In some cases it is advisable to employ higher temperatures such as about 110° C. or higher. A solvent is not necessary, although it is frequently employed in order to control the reaction better. Examples of suitable solvents are aromatic hydrocarbons, monoalkyl ethers of ethylene glycol and aliphatic alcohols. The proportions of the phosphine and the epoxide compound may be varied, and the optimum proportions depend on the specific starting materials. However, about 1 to about 50 parts by weight of phosphine to 100 parts by weight of the epoxide compound are usually used. The proportions are frequently indicated with reference to the amount of phosphine, typical values of about 0.1 to about 35% by weight of phosphine, based on the total weight of phosphine and epoxide compound, being used.

Examples of suitable compounds to be used as components A, B and C as well as of suitable other components of the cationic electrocoating paints, such as, for example, pigments, crosslinking agents, flow-out agents and other customary auxiliary agents, are given in the description of the binders according to the invention.

The binders prepared by the process according to the invention furnish coatings having high elasticity and flexibility as well as good interadhesion characteristics. Especially when used in cationic electrocoating paints, they give rise to coatings which, compared with the known prior art, produce distinctly improved impact, reverse impact and Erichsen indentation values.

The invention furthermore relates to a process for coating electrically conducting substrates, in which
(1) the substrate is immersed in an aqueous electrocoating bath, the electrocoating bath containing as binder a reaction product of
   (A) epoxy resins containing low-molecular, preferably aromatic groups,
   (B) one or more prepolymers having groups reactive toward isocyanate groups,
   (C) primary, secondary and/or tertiary amines and/or their salts or a sulfide/acid mixture or a phosphine/acid mixture,
optionally in combination with other binders and, if desired, crosslinking agents, pigments, flow-out agents and other customary auxiliary agents, the binder having been rendered self-crosslinkable by reaction or the bath containing an additional crosslinking agent,
(2) the substrate is connected as cathode,
(3) a film is deposited on the substrate by the action of direct current,
(4) the substrate is removed from the electrocoating bath and
(5) the deposited paint film is baked,
wherein
a) epoxy resins having an epoxide equivalent weight below 750 are used as the component (A),
b) 10 to 60% by weight, preferably 20 to 40% by weight, based on the total binder, of one or more prepolymers having a molecular weight (mass average) of 500 to 5000 and an average content per molecule of 0.1 to 1.9 hydroxyl groups and 0.1 to 1.0 carboxyl groups are used as the component (B), the total of the hydroxyl and carboxyl groups being greater than, or equal to, 1 and smaller than, or equal to, 2,
c) the reaction product from (A) and (B) has an aromatic groups content of 10 to 45% by weight, calculated as phenylene groups contained in the resin solids in % by weight.

The electrocoating bath is brought into contact with an electrically conducting anode and with the electrically conducting substrate connected as cathode. When electric current passes between the anode and cathode, a strongly adhering paint film is deposited on the cathode.

The temperature of the electrocoating bath should be between 15° to 35° C., preferably between 20° and 30° C.

The applied voltage may fluctuate within a wide range and may lie, for example, between two and one thousand volts. However, typical voltages in practice are between 50 and 500 volts. The current density usually is between about 10 and 100 ampere/m². The current density tends to drop in the course of the deposition.

After the deposition the coated object is rinsed and is ready for baking.

The deposited paint films are generally baked at temperatures from 130° to 200° C. over a period from 10 to 60 minutes, preferably at 150° to 180° C. over a period from 15 to 30 minutes.

The invention is elucidated in greater detail in the examples below. All data referring to parts and percentages are by weight unless expressly stated otherwise.

Preparation of a solution of a crosslinking agent

According to DE-OS 2,701,002, Example 1, a blocked isocyanate crosslinking agent (polyurethane crosslinking agent) is prepared by slowly adding 218 parts of 2-ethylhexanol to 291 parts of an 80/20 isomeric mixture of 2,4-/2,6-toluylene diisocyanate with stirring in an atmosphere of hydrogen, the reaction temperature being kept below 38° C. by external cooling. The mixture is kept at 38° C. for a further half hour and then heated to 60° C., following which 75 parts of trimethylolpropane and then 0.08 parts of dibutyltin dilaurate are added as catalyst. When the initial exothermic reaction subsides, the mixture is kept at 121° C. for 1.5 hours until all of the isocyanate groups are essentially used up, which is identifiable by the infra-red spectrum. The mixture is then diluted with 249 parts of ethylene glycol monoethyl ether.

Preparation of the polyester 1

1930 parts by weight of adipic acid, 1375 parts by weight of neopentyl glycol and 132 parts by weight of xylene are weighed into a reaction vessel, the temperature of which can be controlled, provided with a stirrer, thermometer and a packed column, and the reaction mixture is slowly heated to 140° C. The water of reaction which separates is continuously removed. Esterification is allowed to proceed with a further temperature rise to a maximum of 180° C. until an acid value of 92.6 mg of KOH/g is reached.

Preparation of the polyester 2

2591 parts by weight of polycaprolactone diol (molecular weight 532), 487 parts by weight of succinic anhydride and 122 parts by weight of xylene are weighed into a reaction vessel, the temperature of which can be controlled, provided with a stirrer and thermometer, and the reaction mixture is slowly heated to 100° C. The esterification reaction is allowed to proceed, while the temperature rises to a maximum of 130° C., until an acid value of 86.9 mg of KOH/g is reached.

Preparation of the polyester 3

In the same manner as in the preparation of the polyester 1, 1930 parts by weight of adipic acid and 1375 parts by weight of neopentyl glycol are reacted in 132 parts of xylene. In contrast to the preparation of the polyester 1, the esterification reaction is allowed to proceed until an acid value of 62.9 mg of KOH/g is reached.

Preparation of a grinding binder 800 parts of butyl glycol are added to 953 parts of a commercial epoxy resin based on bisphenol A with an epoxide equivalent weight (EEW) of 890. The mixture is heated to 80° C. 221 parts of a reaction product obtained from 101 parts of dimethylethanolamine and 120 parts of 80% aqueous lactic acid are added to the solution of the resin. The reaction is allowed to proceed at 80° C. until the acid value has fallen below 1.

Preparation of a catalyst paste 43.73 parts of deionized water, 23.37 parts of the grinding binder and 32.90 parts of dibutyltin oxide are mixed and ground in a mill to a Hegman fineness of 7. The catalyst paste is then filtered.

Preparation of a gray pigment paste 1800 parts of the grinding binder are initially mixed with 2480 parts of deionized water, and 936 parts of an extender based on aluminum silicate, 1600 parts of $TiO_2$, 20 parts of carbon black, 200 parts of lead silicate and 28 parts of a stratified silicate are added. This mixture is comminuted in a grinding aggregate to Hegman fineness of 5 to 7. 200 parts of deionized water and 189 parts of the catalyst paste are then added and mixed.

Example 1

12.804 parts by weight of an epoxy resin based on bisphenol A (epoxide equivalent weight EEW=188), 1.112 parts by weight of xylene and 5.410 parts by weight of the polyester 1 are weighed into a reaction vessel heatable by heat transfer oil and provided with a stirrer, reflux condenser and internal thermometer and heated to 110° C. 3.882 parts by weight of bisphenol A are added and the heating is continued. When a temperature of 143° C. is reached, 0.027 parts by weight of dimethylbenzylamine are added and heating is continued until an exothermic reaction sets in. The temperature is then kept above 160° C. until the epoxide equivalent weight (EEW) reaches a value of 632. The reaction mixture is then cooled to 127° C. and 0.054 parts by weight of dimethylbenzylamine is added. The reaction mixture is heated to 130° C. and the temperature is kept at this level until an EEW of 1200 is reached. 16.452 parts by weight of a solution of a crosslinking agent are then rapidly added, the reaction mixture is cooled to 99° C., and 1.292 parts by weight of a 72.5% solution of the methyl isobutyl diketimine of diethylenetriamine in methyl isobutyl ketone and 1.006 parts by weight of methylethanolamine are added. When the exothermic reaction has subsided, the reaction mixture is heated for a further 1 hour at 113°-116° C. and then treated with 2.356 parts by weight of hexyl glycol.

The resultant binder 1 is then dispersed in water as follows: 24.964 parts by weight of deionized water and 0.484 parts by weight of acetic acid are initially mixed and the binder solution described above is added with stirring. After 60 minutes' homogenization a further 30.334 parts by weight of deionized water are added dropwise with stirring in the course of 1 hour. The mixture is finally filtered through a plate filter. The resultant binder dispersion 1 has a solids content of 35.5%, an MEQ base value of 0.57 milliequivalents/g of resin solids and an MEQ acid value of 0.23 milliequivalents/g of resin solids. For the preparation of a pigmented cationic electrocoating bath, 2280 parts by weight of deionized water are placed in a vessel provided with a stirrer and 1922 parts by weight of the above binder dispersion 1 as well as 775 parts by weight of the pigment paste are added.

The mixture is stirred for about 72 hours, after which time the pigmented bath has a pH of 6.58 and a solids content of about 20%.

The deposition of the paint films takes place after a 10-day period of aging and after ultrafiltration of the paint bath for 120 seconds at a bath temperature of 27° C. The deposition voltage is in each case chosen such that a film thickness of 18 μm results. Zinc phosphated panels, connected as cathode, form the substrate. The coated panels are rinsed and dried for 15 minutes in a circulating air oven at 180° C. The test results of the coatings are given in Table 1.

Example 2

The procedure of Example 1 was followed, except that for the preparation of the binder 5.759 parts by weight of the polyester 2 were used instead of 5.410 parts by weight of the polyester 1. The resultant binder dispersion 2 has a solids content of 36.1%, an MEQ base value of 0.54 milliequivalents/g of resin solids and an MEQ acid value of 0.24 milliequivalents/g of resin solids. The test results obtained on the coating prepared in the same manner as in Example 1 using this binder dispersion 2 are shown in Table 1.

Example 3

The procedure of Example 1 was followed, except that for the preparation of the binder 7.955 parts by weight of the polyester 3 was used instead of 5.410 parts by weight of the polyester 1. The resultant binder dispersion 3 has a solids content of 36.3%, an MEQ base value of 0.52 milliequivalents/g of resin solids and an MEQ acid value of 0.25 milliequivalents/g of resin solids. The test results obtained with the coating prepared in the same manner as in Example 1 using this binder dispersion 3 are shown in Table 1.

Comparison Example

Example 1 according to the invention was processed as instructed in DE-PS 2,701,002, Example 6, except that 4.751 parts by weight of polycaprolactone diol with a molecular weight of 532 was used for the preparation of the binder instead of 5.410 parts by weight of the polyester 1.

The test results obtained with the coating prepared in the same manner as in Example 1 using this binder dispersion are shown in Table 1.

TABLE 1

| | Results of the depositions | | | |
|---|---|---|---|---|
| | Example 1 | Example 2 | Example 3 | Comparison |
| Film thickness (μm) | 18 | 18 | 18 | 18 |
| MIBK test[1] | pass | pass | pass | pass |
| Erichsen indentation (mm) | 5.8 | 5.6 | 6.3 | 4.5 |
| Ball impact test (reverse impact test) (m kg) | 0.23 | 0.23 | 0.46 | 0.06 |
| Ball impact test (impact test) (m kg) | 0.46 | 0.46 | 0.69 | 0.12 |

[1] 1:20 double rubbings using a cotton wool pad saturated with methyl isobutyl ketone The test results of Table 1 indicate that, compared with the coatings prepared using the binders known from the prior art (DE-PS 2,701,002), the coatings prepared using the binders according to the invention furnish distinctly better results in the reverse impact test and the impact test. The Erichsen indentation values are furthermore improved.

We claim:

1. A composition, comprising the reaction product of:
   (A) an epoxy resin having an epoxide equivalent weight below 750;
   (B) a prepolymer having a molecular weight of 500 to 5000 and an average content per molecule of 0.1 to 1.9 hydroxyl groups and 0.1 to 1.0 carboxyl groups, wherein the total of the hydroxyl and carboxyl groups is greater than or equal to 1, and smaller than or equal to 2; and
   (C) a primary, secondary and/or tertiary amine and/or amine salt or a sulfide/acid mixture or a phosphine/acid mixture;
   wherein the prepolymer comprises 10 to 60% by weight of the reaction product, and
   wherein components (A) and (B) have a combined aromatic group content, calculated as weight of phenylene groups, of 10 to 45% by weight.

2. The composition as claimed in claim 1, wherein the epoxy resin is a diglycidyl ether of a polyphenol.

3. The composition as claimed in claim 1, wherein the molecular weight of the prepolymer is 530 to 3000.

4. The composition as claimed in claim 1, wherein the prepolymer is a linear polyester.

5. A process for coating electrically conducting substrates, in which process
   (1) the substate is immersed in an aqueous electrocoating bath, the electrocoating bath containing as binder the reaction product of:
      (A) an epoxy resin having an epoxide equivalent weight below 750;
      (B) a prepolymer having a molecular weight of 500 to 5000 and an average content per molecule of 0.1 to 1.9 hydroxyl groups and 0.1 to 1.0 carboxyl groups, wherein the total of the hydroxyl and carboxyl groups is greater than, or equal to, 1 and smaller than, or equal to 2; and
      (C) a primary, secondary and/or tertiary amine and/or amine salt or a sulfide/acid mixture or a phosphine/acid mixture,
   wherein the prepolymer comprises 10 to 60% by weight of the reaction product, and
   wherein components (A) and (B) have a combined aromatic group content, calculated as weight of phenylene groups, of 10 to 45% by weight;
   (2) the substrate is connected as cathode,
   (3) a film is deposited on the substrate by the action of direct current,
   (4) the substrate is removed form the electrocoating bath and (5) the deposited film is baked.

6. The process as claimed in claim 5, wherein the epoxy resin is a diglycidyl ether of a polyphenol.

7. The process as claimed in claim 5, wherein the molecular weight of the component B is 500-3000.

8. The process as claimed in claim 5, wherein the component B is a linear polyester.

9. Electrocoating paints comprising a composition as claimed in claim 1.

10. The composition as claimed in claim 1, wherein the prepolymer comprises 20 to 40% by weight of the reaction product.

11. The process as claimed in claim 5, wherein the electrocoating bath further contains a crosslinking agent capable of crosslinking the binder during step (5).

12. The process as claimed in claim 5, wherein the binder is self-crosslinkable during Step (5).

* * * * *